(12) United States Patent
Nakahori

(10) Patent No.: US 7,209,024 B2
(45) Date of Patent: Apr. 24, 2007

(54) FILTER CIRCUIT AND POWER SUPPLY UNIT

(75) Inventor: Wataru Nakahori, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 11/376,145

(22) Filed: Mar. 16, 2006

(65) Prior Publication Data

US 2006/0221655 A1    Oct. 5, 2006

(30) Foreign Application Priority Data

Mar. 31, 2005    (JP) ............................. 2005-105473

(51) Int. Cl.
*H01F 27/28* (2006.01)

(52) U.S. Cl. ....................... 336/170; 363/47

(58) Field of Classification Search .................. 336/65, 336/83, 170, 212, 213–215, 220, 221–222; 323/355, 356, 361; 333/181–183; 363/39, 363/44–48

See application file for complete search history.

(56) References Cited

U.S. PATENT DOCUMENTS

| 3,229,184 | A | * | 1/1966 | Churchill | ...................... 363/46 |
| 3,340,458 | A | * | 9/1967 | Keller | .......................... 363/48 |
| 4,422,056 | A | * | 12/1983 | Roberts | ....................... 333/177 |
| 4,876,638 | A | * | 10/1989 | Silva et al. | .................... 363/97 |
| 4,888,675 | A | * | 12/1989 | Kumar et al. | ................. 363/47 |
| 5,335,163 | A | * | 8/1994 | Seiersen | ...................... 363/126 |

FOREIGN PATENT DOCUMENTS

JP    A 11-122911    4/1999

* cited by examiner

*Primary Examiner*—Tuyen T. Nguyen
(74) *Attorney, Agent, or Firm*—Oliff & Berridge, PLC (57) ABSTRACT

The present invention provides a filter circuit realizing reduction in the number of magnetic cores on a circuit board and a space occupied by the magnetic cores, and a power supply unit using the filter circuit. A filter circuit includes a first filter part and a second filter part which are connected in series. The first filter part includes a center leg coil and a capacitor, and the second filter part includes an outer leg coil and a capacitor. The center leg coil is wound around a center leg of a magnetic core including the center leg, a first outer leg part configuring a loop magnetic path in common with the center leg, and a second outer leg part configuring another loop magnetic path in common with the center leg. The first and second outer leg parts share the center leg. The outer leg coil is wound around the outer leg parts in a manner such that magnetic fluxes generated in the outer leg parts by current flowing in the outer leg coil cancel each other in the center leg.

2 Claims, 6 Drawing Sheets

FILTER CIRCUIT AND POWER SUPPLY UNIT

BACKGROUND OF THE INVENTION

1. Field of the Invention

The present invention relates to a filter circuit for smoothing voltage and a power supply unit using the filter circuit.

2. Description of the Related Art

Figure 7:
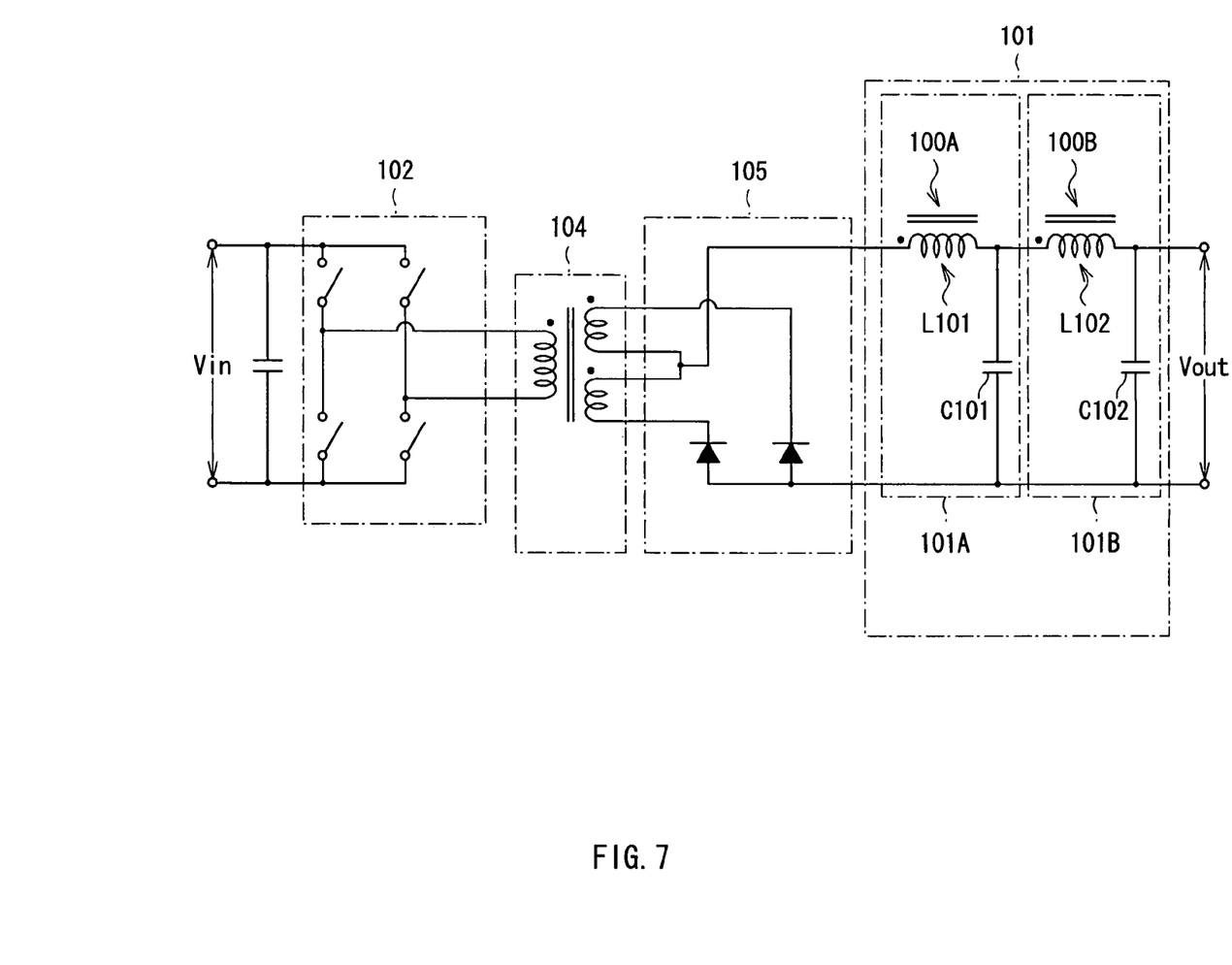
FIG. 7 is a circuit diagram showing the configuration of a conventional filter circuit.

Hitherto, various types of switching power supply units have been proposed and provided for practical use. Many of them are of a type, as shown in FIG. 7 (corresponding to part of FIG. 1 of Japanese Patent Laid-Open No. Hei 11-122911), in which an input DC voltage Vin from a battery (not shown) is switched by switching operation of a switching circuit 102 connected to an input winding of a power conversion transformer 104, an input AC voltage obtained by the switching operation is supplied to the input winding of the power conversion transformer 104, and an output AC voltage obtained as a result of the conversion of the power conversion transformer 104 is output from an output winding of the power conversion transformer 104. A voltage appearing in the output winding in association with the switching operation of the switching circuit 102 is rectified by a rectifier circuit 105, the rectified voltage is converted to an output DC voltage Vout by a smoothing circuit 101, and the smoothed voltage is output.

In a switching power supply unit of this kind, in many cases, the smoothing circuit 101 is configured by serially disposing a smoothing filter circuit 101A for smoothing the output from the rectifier circuit 105, and a noise-reduction filter circuit 101B for reducing noise. The filter circuits 101A and 101B generally include inductors L101 and L102 and capacitors C101 and C102, respectively. To improve the performance of the inductors and to facilitate manufacture of the inductors, generally, magnetic cores 100A and 100B are provided in the inductors L101 and L102, respectively. By providing the magnetic cores 100A and 100B, inductance values increase, so that a ripple voltage of an output of the rectifier circuit 105 and the like can be sufficiently suppressed. Meanwhile, the magnetic cores 100A and 100B have to be disposed separately for the filter circuits 101A and 101B in the two stages, so that the space occupied by the magnetic cores 100A and 100B on the circuit board is large and there is a drawback that it is difficult to reduce the size of the circuit.

SUMMARY OF THE INVENTION

In view of the drawback, it is desirable to provide a filter circuit realizing reduction in the number of magnetic cores on a circuit board and the space occupied by the magnetic cores and a power supply unit using the filter circuit.

A filter circuit of the present invention includes a first filter part and a second filter part which are connected in series each other, the first filter part including a first inductor and a first capacitor, the second filter part including a second inductor and a second capacitor. The first and second inductors are wound around a center leg and a plurality of outer leg parts of a magnetic core. The plurality of outer leg parts configure loop magnetic paths in common with the center leg while sharing the center leg.

Concretely, the first inductor includes a center leg coil wound around the center leg part of the magnetic core. The second inductor includes an outer leg coil wound around the outer leg part of the magnetic core. The outer leg coil is wound around the outer leg part in a manner such that magnetic fluxes generated in the plurality of outer leg parts cancel each other in the center leg by current flowing in the outer leg coil.

The "manner such that magnetic fluxes cancel each other in the center leg" denotes that the physical property of combination of one of the outer leg coil parts and the outer leg part around which the outer leg coil part is wound and that of combination of the other outer leg coil part and the other outer leg part around which the other outer leg coil part is wound are the same in relation with the center leg.

Concretely, the outer leg coil has a first outer leg coil part and a second outer leg coil part. The first outer leg coil part is wound around the outer leg part of one of the loop magnetic paths. The second outer leg coil part is wound around the outer leg part of the other loop magnetic path. The winding directions of the first and second outer leg coil parts are the same polarity direction, and the number of turns of the first outer leg coil part and that of the second outer leg coil part are equal to each other. The "same polarity direction" denotes that directions of magnetic fluxes generated in the outer leg parts are made the same by currents flowing in the outer leg coil parts.

To make the physical property of combination of the first outer leg coil part and the outer leg part around which the first outer leg coil part is wound and the physical property of combination of the second outer leg coil part and the outer leg part around which the second outer leg coil part is wound the same in relation with the center leg coil by equalizing the number of turns of the first outer leg coil part and the number of turns of the second outer leg coil part in the mode, it is a precondition that the outer leg part around which the first outer leg coil part is wound and the outer leg part around which the second outer leg coil part is wound are made of the same material and have the same shape and the same size.

A power supply unit of the present invention includes: a transformer for transforming an input AC voltage and outputs the resultant as an output AC voltage; a rectifying circuit for rectifying the output AC voltage; and a smoothing circuit for smoothing an output of the rectifying circuit. The smoothing circuit is configured by using the above-described filter circuit.

In the filter circuit of the present invention and the power supply unit using the filter circuit, magnetic fluxes generated in the plurality of outer leg parts cancel out each other in the center leg part by currents flowing in the outer leg coil, so that voltage is not substantially inducted from the outer leg coil to the center leg coil. Meanwhile, the physical property of combination of one of the outer leg coil parts and one of outer leg parts around which the outer leg coil part is wound and the physical property of combination of the other outer leg coil part and the other outer leg part around which the other outer leg coil part is wound are the same in relation with the center leg coil. Consequently, magnetic fluxes generated in the plurality of outer leg parts cancel out each other in the outer leg parts by currents flowing in the center leg coil, so that voltage is not substantially induced from the center leg coil to the outer leg coils. Thus, there is no possibility that the center leg coil and the outer leg coils do not influence on each other though they are wound on the common magnetic core.

In the filter circuit of the invention and the power supply unit using the filter circuit, the first and second inductors do not influence on each other, so that there is no possibility that the functions of the first and second filter parts deteriorate. With the configuration, two magnetic cores conventionally necessary can be replaced with a common magnetic core. As a result, the number of magnetic cores and the space occupied by the magnetic cores can be reduced. Therefore, the size of the filter circuit having a two-stage configuration can be reduced.

Other and further objects, features and advantages of the invention will appear more fully from the following description.

DETAILED DESCRIPTION OF THE PREFERRED EMBODIMENTS

An embodiment of the present invention will be described in detail hereinbelow with reference to the drawings.

Figure 1A:
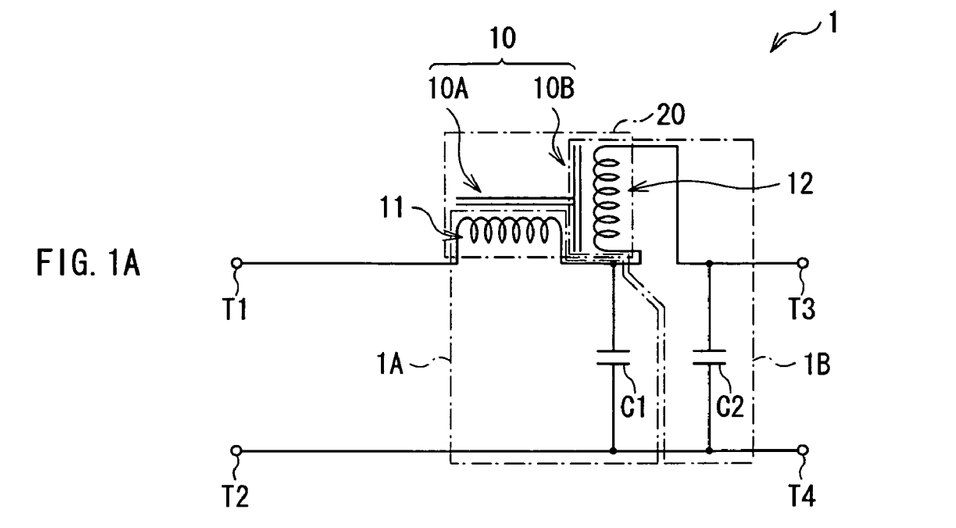
FIGS. 1A and 1B are circuit diagrams showing the configuration of a filter circuit according to an embodiment of the invention.
Figure 1B:
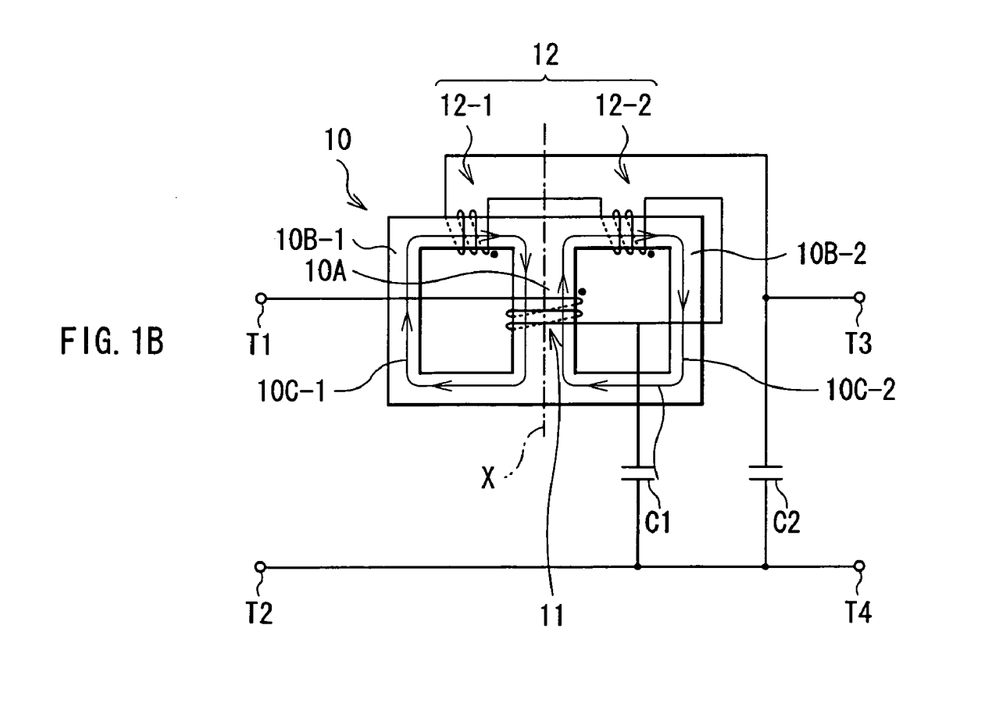

FIG. 1A shows a schematic configuration of a filter circuit 1 according to an embodiment of the invention. FIG. 1B shows a magnetic device 20 in the filter circuit 1 of FIG. 1A more concretely. The filter circuit 1 has the magnetic device 20 and capacitors C1 and C2. The magnetic device 20 has a magnetic core 10, a center leg coil (first inductor) 11, and an outer leg coil (second inductor) 12.

The magnetic core 10 has a center leg 10A and an outer leg 10B. The outer leg 10B has a first outer leg part 10B-1 configuring a first loop magnetic path 10C-1 in common with the center leg 10A while sharing the center leg 10A, and a second outer leg part 10B-2 configuring a second loop magnetic path 10C-2 in common with the center leg 10A while sharing the center leg 10A. In the embodiment, it is assumed that the first and second outer leg parts 10B-1 and 10B-2 are made of the same material and have the same shape and size.

The center leg coil 11 is wound around the center leg 10A of the magnetic core 10 and is, for example, a coil functioning as an inductor. One end of the center leg coil 11 is connected to an input terminal T1 and the other end is connected to one end of the outer leg coil 12 and the capacitor C1.

The outer leg coil 12 is wound around the outer leg 10B of the magnetic core 10 and is, for example, a single coil functioning as an inductor. One end of the outer leg coil 12 is connected to the other end of the center leg coil 11 and the capacitor C1, and the other end is connected to an outer terminal T3 and the capacitor C2.

The capacitor C1 is connected to the other end of the center leg coil 11 and a line connecting an input terminal T2 and an output terminal T4, and the capacitor C2 is connected to the other end of the outer leg coil 12 and a line connecting the input terminal T2 and the output terminal T4.

The center leg coil 11 and the capacitor C1 configure a first filter part 1A and have, for example, a function of smoothing voltage input to the input terminals T1 and T2.

On the other hand, the outer leg coil 12 and the capacitor C2 configure a second filter part 1B and have, for example, a function of reducing noise included in the voltage supplied from the first filter part 1A at the ante stage.

As shown in FIG. 1B, the outer leg coil 12 is configured by a first outer leg coil part 12-1 and a second outer leg coil part 12-2 and is continuously wound around the first outer leg part 10B-1 and the second outer leg part 10B-2 of the magnetic core 10. Concretely, the first outer leg coil part 12-1 is wound around the first outer leg part 10B-1 of a first loop magnetic path 10C-1, and the second outer leg coil part 12-2 is wound around the second outer leg part 10B-2 of a second loop magnetic path 10C-2. The winding directions of the first and second outer leg coil parts 12-1 and 12-2 are the same in polarity, and the number of turns of the first outer leg coil part 12-1 and that of the second outer leg coil 12-2 are equal to each other. The "same in polarity" indicates that the direction of magnetic flux generated in the first outer leg part 10B-1 and that in the second outer leg part 10B-2 by the currents flowing in the first and second outer leg coil parts 12-1 and 12-2 are the same.

Since the first and second outer leg parts 10B-1 and 10B-2 are made of the same material and have the same shape and size and the number of turns and the winding direction of the first outer leg coil part 12-1 and those of the second outer leg coil part 12-2 are the same as described above, physical property (hereinbelow, called first physical property) of combination of the first outer leg coil part 12-1 and the first outer leg part 10B-1 around which the first outer leg coil part 12-1 is wound and physical property (hereinbelow, called second physical property) of combination of the second outer leg coil part 12-2 and the second outer leg part 10B-2 around which the second outer leg coil part 12-2 is wound are the same in the relation with the center leg coil 11.

The configuration that the first and second physical properties are "the same" in the relation with the center leg coil 11 is not limited to the above. The material, shape, size, and the like of the outer leg part 10B-1 and those of the outer leg part 10B-2 may be different from each other. In such a case, it is necessary to properly adjust the number of turns or the like in each of the first and second outer leg coil parts 12-1 and 12-2.

As long as the first physical property and the second physical property are the same in the relation with the center leg coil 11, a mode may be employed in which the winding direction of the first outer leg coil part 12-1 and that of the second outer leg coil part 12-2 are different from each other. For example, another mode may be employed in which the winding position of the first outer leg coil part 12-1 and that of the second outer leg coil part 12-2 are not line symmetrical with respect to a center axis X in the extending direction of the center leg coil 11 as a reference.

The action of the filter circuit having such a configuration will now be described. In the filter circuit, for example, the voltage input to the input terminals T1 and T2 is smoothed by the first filter part 1A, noise included in the voltage output from the first filter part 1A is reduced by the second filter part 1B, and DC voltage is output from the output terminals T3 and T4.

Figure 2:
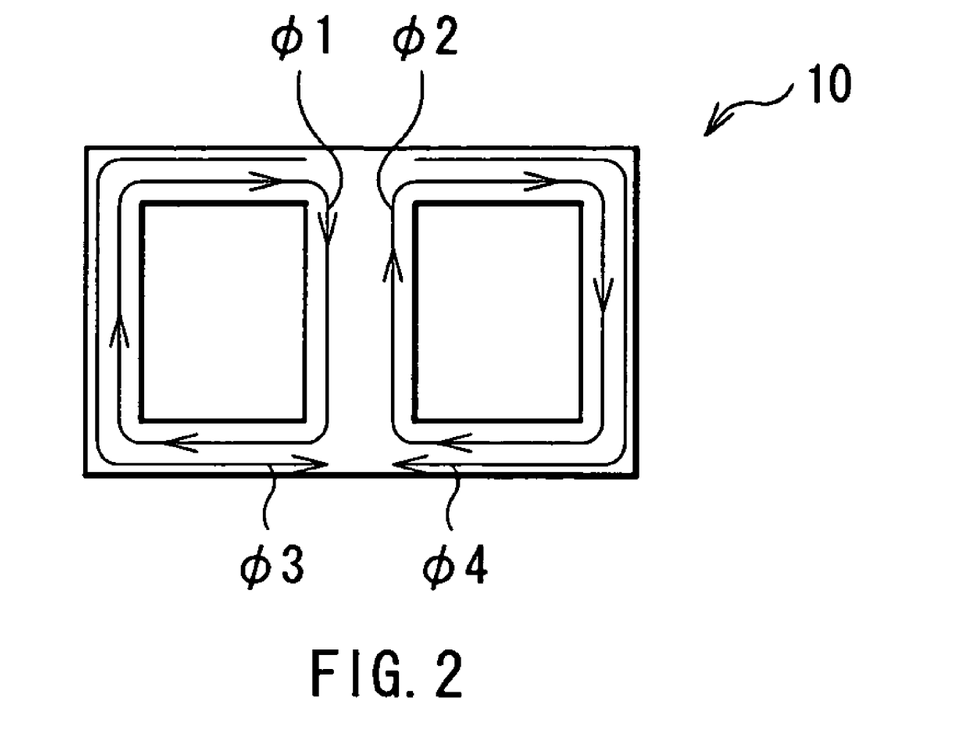
FIG. 2 is a conceptual diagram illustrating the flows of magnetic fluxes in a magnetic device in FIG. 1.

At this time, in the magnetic device 20 of the filter circuit, as shown in FIG. 2, a magnetic flux $\phi 1$ generated in the first outer leg part 10B-1 and a magnetic flux $\phi 2$ generated in the second outer leg part 10B-2 by the current flowing in the outer leg coil 12 cancel each other in the center leg 10A, so that voltage is not substantially induced from the outer leg coil 12 to the center leg coil 11. Meanwhile, magnetic fluxes $\phi 3$ and $\phi 4$ generated in loop magnetic paths configured by the first and second outer leg parts 10B-1 and 10B-2 by currents flowing in the center leg coil 11 also cancel each other, so that voltage is not substantially induced from the center leg coil to the outer leg coil. Consequently, there is no possibility that the center leg coil and the outer leg coil an influence on each other though they are wound around the common magnetic core 10.

In the filter circuit 1 of the embodiment, the center leg coil 11 and the outer leg coil 12 do not influence on each other, so that there is no possibility that the functions of the first filter part 1A including the center leg coil 11 and the capacitor C1 and the second filter part 1B including the outer leg coil 12 and the capacitor C2 deteriorate. Consequently, one magnetic core can be commonly used in place of two magnetic cores which are conventionally needed. As a result, the number of magnetic cores and the space occupied by the magnetic cores can be reduced. Therefore, the filter circuit can be miniaturized by reducing the number of magnetic cores and the space occupied by the magnetic cores while having a two-stage configuration.

Figure 3:
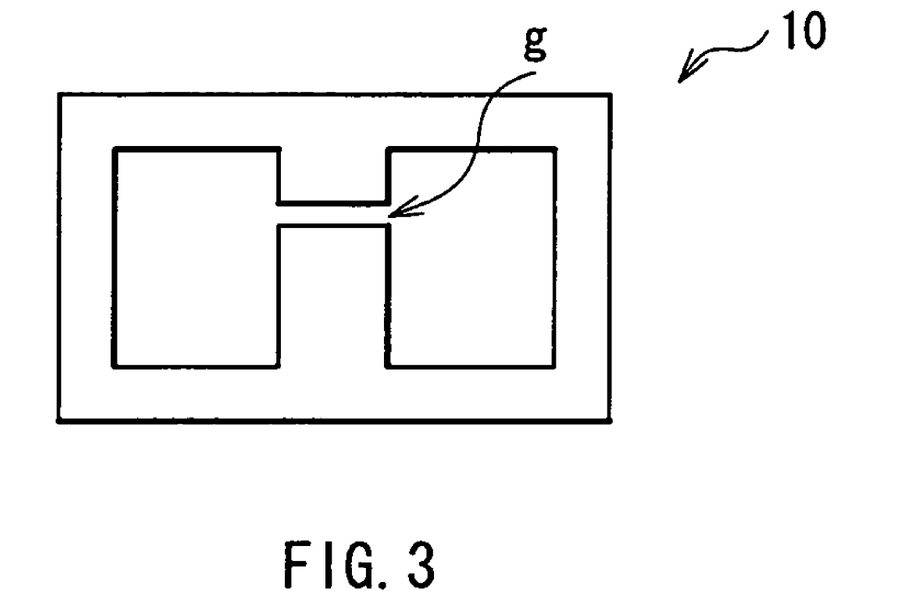
FIG. 3 is a schematic diagram showing the configuration of a modification of a magnetic core in FIG. 1.

As shown in FIG. 3, an air gap "g" may be provided in the center leg part 10A of the magnetic core 10. In the case where the air gap "g" is increased, as compared with the case where there is no air gap "g" or the air gap "g" is small, magnetic coupling between the first outer leg coil part 12-1 and the second outer leg coil part 12-2 wound around the outer leg 10B is enhanced. On the other hand, in the case where the air gap "g" is made small, as compared with the case where the air gap "g" is large, magnetic coupling between the first outer leg coil part 12-1 and the second outer leg coil part 12-2 wound around the outer leg 10B is weakened.

APPLICATION EXAMPLES

Figure 4:
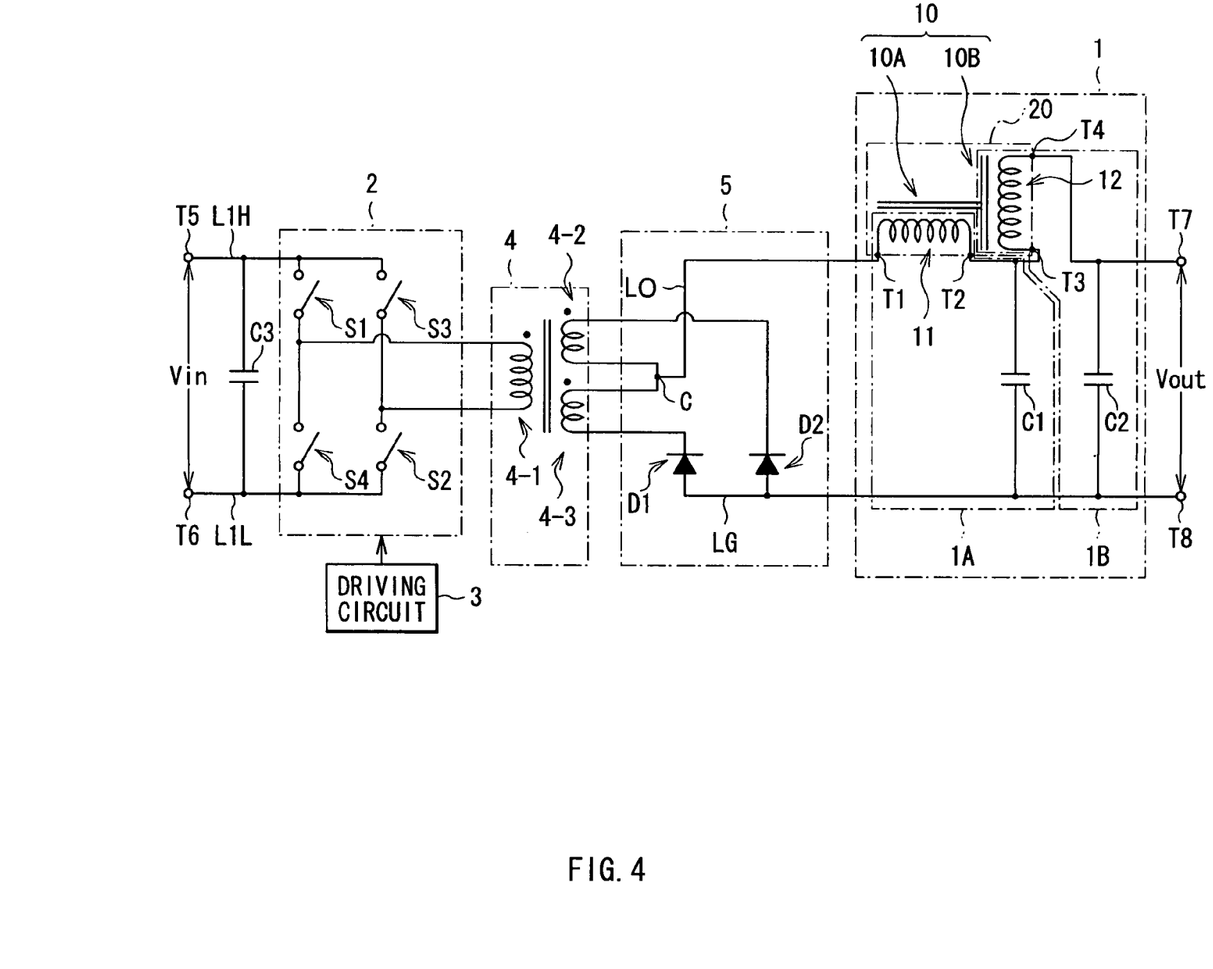
FIG. 4 is a circuit diagram showing the configuration of a power supply unit in an application example of the magnetic device in FIG. 1.
Figure 5A:
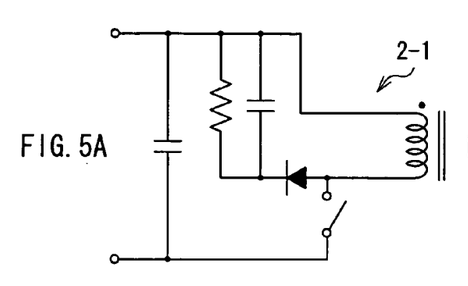
FIGS. 5A to 5E are circuit diagrams of switching circuits.
Figure 5B:
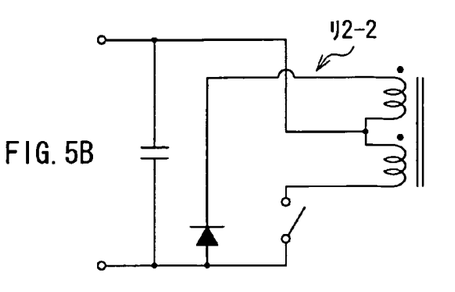
Figure 5C:
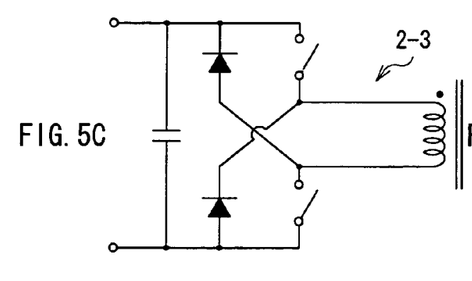
Figure 5D:
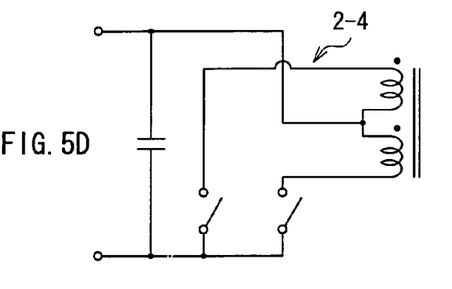
Figure 5E:
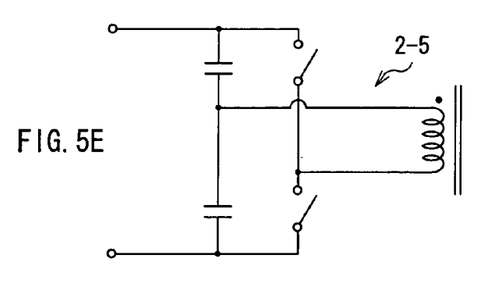

FIG. 4 shows a schematic configuration of a power supply unit using the filter circuit 1 of the foregoing embodiment.

The power supply unit functions as a DC-DC converter for converting an input high DC voltage Vin supplied from, for example, a high-voltage battery (not shown) to an output DC voltage Vout which is lower than the input DC voltage Vin and supplying the output DC voltage Vout to, for example, a low-voltage battery (not shown). The power supply is of a forward type as will be described later.

The power supply unit has a transformer 4, a switching circuit 2 provided on the primary side of the transformer 4, a drive circuit 3 and a smoothing capacitor C3 for driving the switching circuit 2, and a rectifier circuit 5 and the filter circuit 1 provided on the secondary side of the transformer 4. The input DC voltage Vin output from, for example, the high-voltage battery is applied across the input terminal T5 of a primary-side high-voltage line L1H and the input terminal T6 of a primary-side low-voltage line L1L. The output DC voltage Vout to be supplied to, for example, the low-voltage battery is output between the output terminal T7 of an output line LO and the output terminal T8 of a ground line LG.

The transformer 4 is obtained by winding a transformer coil set of a 1-input 1-output type that includes a primary winding 4-1 whose number of turns is Na and a secondary winding 4-2, 4-3 whose number of turns is Nb, around the magnetic core 10. The transformer 4 drops an input AC voltage supplied from the switching circuit 2 and outputs an output AC voltage from the secondary winding 4-2, 4-3. The degree of voltage drop in this case is determined by the ratio (Nb/Na) between the number of turns of the primary winding 4-1 and the number of turns of the secondary winding 4-2, 4-3.

The switching circuit 2 is a single-phase inverter circuit for converting the input DC voltage Vin output from, for example, a high-voltage battery to a single-phase AC voltage having an almost rectangular wave shape. The switching circuit 2 is a full-bridge type switching circuit obtained by full-bridge connecting four switching elements S1, S2, S3, and S4 driven by switching signals (not shown) supplied from the drive circuit 3. As the switching elements, for example, MOS-FETs (Metal Oxide Semiconductor-Field Effect Transistors) or IGBTs (Insulated Gate Bipolar Transistors) are used.

The switching element S1 is provided between the primary-side high-voltage line L1H and one end of the primary winding 4-1 of the transformer 4, and the switching element S2 is provided between the other end of the primary winding 4-1 and the primary-side low-voltage line L1L. The switching element S3 is provided between the primary-side high-voltage line L1H and the other end of the primary winding 4-1, and the switching element S4 is provided between one end of the primary winding 4-1 and the primary-side low-voltage line L1L.

In the switching circuit 2, when the switching elements S1 and S2 are turned on, current passes through a first current path extending from the primary-side high-voltage line L1H through the switching element S1, the primary winding 4-1, and the switching element S2 to the primary-side low-voltage line L1L. On the other hand, when the switching elements S3 and S4 are turned on, current passes through a second current path extending from the primary-side high-voltage line L1H through the switching element S3, the primary winding 4-1, and the switching element S4 to the primary-side low-voltage line L1L.

The rectifier circuit 5 is a center tap type rectifier circuit including a pair of diodes D1 and D2. The anode of the diode D1 is connected to one end of a secondary winding 4-3, and the anode of the diode D2 is connected to one end of the secondary winding 4-2. The other end of the secondary winding 4-2 and the other end of the secondary winding 4-3 are connected to the output line LO. Hereinbelow, the connection point will be called a connection point C. The cathodes of the diodes D1 and D2 are connected to each other and are also connected to the ground line LG. Each of the pair of diodes D1 and D2 rectifies each of half wave periods of the output AC voltage of the transformer 4.

The filter circuit 1 is configured by serially disposing a filter circuit for smoothing (first filter part 1A) configured by including the center leg coil 11 as a choke coil and the capacitor C1 as a smoothing capacitor and a filter circuit for reducing noise (second filter part 1B) configured by including the outer leg coil 12 as a choke coil and the capacitor C2 as a smoothing capacitor.

The center leg coil 11 is wound around the center leg 10A of the magnetic core 10. On the other hand, the outer leg coil 12 is configured by the first outer leg coil part 12-1 and the second outer leg coil part 12-2 as shown in FIG. 1B. The outer leg coil 12 is continuously wound around the first outer leg part 10B-1 and the second outer leg part 10B-2 of the magnetic core 10. Concretely, the first and second outer leg coil parts 12-1 and 12-2 are wound around the first outer leg part 10B-1 of the first loop magnetic path 10C-1 and the second outer leg part 10B-2 of the second loop magnetic path 10C-2 so the their winding directions become the same polarity direction and their numbers of turns are equal to each other. The first and second outer leg coil parts 12-1 and 12-2 are connected to each other in series.

In the filter circuit for smoothing, the center leg coil 11 is disposed so as to be inserted in the output line LO, one end of the center leg coil 11 is connected to the other end of the secondary winding 4-2 and the other end of the secondary winding 4-3, and the other end is connected to one end of the outer leg coil 12. The capacitor C1 is connected between one end of the outer leg coil 12 and the output terminal T4 of the ground line LG.

In the filter circuit for reducing noise, the outer leg coil 12 is disposed so as to be inserted in the output line LO, one end of the outer leg coil 12 is connected to the other end of the center leg coil 11 and the capacitor C1, and the other end is connected to the output terminal T7 of the output line LO. The capacitor C2 is connected between the output terminal T7 of the output line LO and the output terminal T8 of the ground line LG.

The filter circuit 1 smoothes the voltage rectified by the pair of diodes D1 and D2 to generate DC voltage, reduces noise included in the DC voltage to generate an output DC voltage Vout1, and supplies the output DC voltage Vout1 to, for example, the low-voltage battery from the output terminals T7 and T8.

In the power supply unit of the application example, as shown in FIG. 2, the magnetic fluxes $\phi 1$ and $\phi 2$ generated in the first and second outer leg parts 10B-1 and 10B-2 by the current flowing in the outer leg coil 12 cancel each other in the center leg 10A, so that voltage is not substantially induced from the outer leg coil 12 to the center leg coil 11. Meanwhile, the magnetic fluxes $\phi 3$ and $\phi 4$ generated in the loop magnetic paths configured by the first and second outer leg parts 10B-1 and 10B-2 by the current flowing in the center leg coil 11 also cancel each other in the loop magnetic paths, so that voltage is not substantially induced from the center leg coil to the outer leg coil. Consequently, there is no possibility that the center leg coil and the outer leg coil do not influence on each other though they are wound around the common magnetic core 10.

In the power supply unit of the application example, the center leg coil 11 and the outer leg coil 12 do not influence on each other, so that there is no possibility that the functions of the first filter part 1A including the center leg coil 11 and the capacitor C1 and the second filter part 1B including the outer leg coil 12 and the capacitor C2 deteriorate. Thus, a single magnetic core can be commonly used in place of two magnetic cores conventionally needed. As a result, the number of magnetic cores and the space occupied by the magnetic cores can be reduced. Therefore, the power supply unit can be miniaturized while having a smoothing circuit of a two-stage configuration.

Although the present invention has been described above by the plurality of embodiments and the plurality of application examples, the invention is not limited to them but can be variously modified.

Figure 6A:
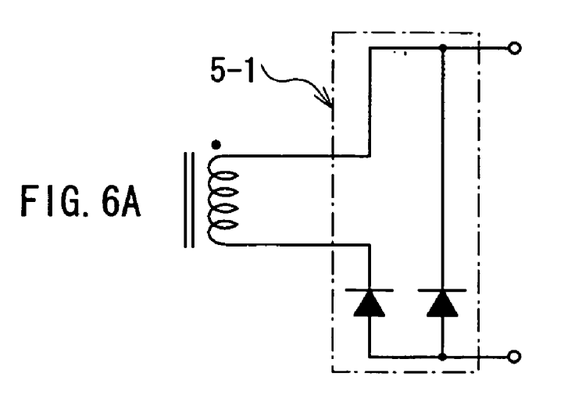
FIGS. 6A to 6C are circuit diagrams of rectifier circuits.
Figure 6B:
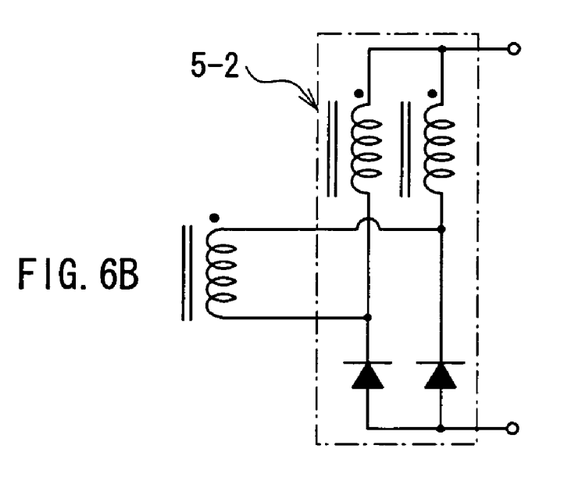
Figure 6C:
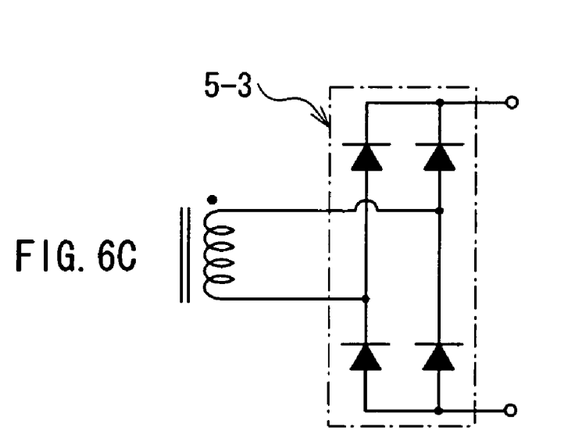

For example, in the power supply unit in the application example, the switching circuit 2 is of a full bridge type. Alternately, as shown in FIGS. 5A to 5E, the switching circuit 2 may be of a forward type 2-1, a forward type 2-2 with a reset winding, a double-forward type 2-3, a push-pull type 2-4, a half-bridge type 2-5, or the like. Although the rectifier circuit 5 of the center tap type is used, a rectifier circuit of a forward type 5-5, a current doubler type 5-2, a full bridge type 5-3, or the like as shown in FIG. 6A to 6C can be also employed.

What is claimed is:

1. A filter circuit comprising a first filter part and a second filter part which are connected in series each other, the first filter part including a first inductor and a first capacitor, the second filter part including a second inductor and a second capacitor, wherein the first inductor includes a center leg coil wound around a center leg of a magnetic core including the center leg and a plurality of outer legs, each of the outer legs configuring a loop magnetic path in common with the center leg while sharing the center leg, the second inductor includes an outer leg coil wound around the outer leg of the magnetic core, the outer leg coil includes a first outer leg coil part and a second outer leg coil part which are connected in series each other, the first outer leg coil part being wound around the outer leg configuring one of the loop magnetic paths, the second outer leg coil part being wound around the outer leg configuring the other loop magnetic path, the winding directions of the first and second outer leg coil parts are the same in polarity direction, the number of turns of the first outer leg coil part and that of the second outer leg coil part are equal to each other, and the outer leg coil is wound around the outer legs in a manner such that magnetic fluxes generated in the plurality of outer legs by current flowing in the outer leg coil cancel each other in the center leg part.

2. A power supply unit comprising:

a transformer configured to transform an input AC voltage and to output the resultant as an output AC voltage;

a rectifying circuit operable to rectify the output AC voltage; and a smoothing circuit operable to smooth an output of the rectifying circuit, wherein the smoothing circuit is configured by using the filter circuit according to claim 1.

* * * * *